US011794266B2

(12) United States Patent
 Larikka

(10) Patent No.: US 11,794,266 B2
(45) Date of Patent: Oct. 24, 2023

(54) DEVICE FOR WELDING PIPE BRANCHES AND EXTENSIONS

(71) Applicant: Leo Larikka, Vantaa (FI)

(72) Inventor: Leo Larikka, Vantaa (FI)

( * ) Notice: Subject to any disclaimer, the term of this patent is extended or adjusted under 35 U.S.C. 154(b) by 624 days.

(21) Appl. No.: 16/970,746

(22) PCT Filed: Feb. 21, 2019

(86) PCT No.: PCT/FI2019/050138
 § 371 (c)(1),
 (2) Date: Aug. 18, 2020

(87) PCT Pub. No.: WO2019/166689
 PCT Pub. Date: Sep. 6, 2019

(65) Prior Publication Data
 US 2021/0016380 A1    Jan. 21, 2021

(30) Foreign Application Priority Data
 Mar. 2, 2018   (FI) ..................................... 20185203

(51) Int. Cl.
 *B23K 9/028*   (2006.01)
 *B23K 9/29*   (2006.01)
 (Continued)

(52) U.S. Cl.
 CPC ............ *B23K 9/0284* (2013.01); *B23K 9/291* (2013.01); *B23K 37/0276* (2013.01); *B23K 2101/06* (2018.08)

(58) Field of Classification Search
 CPC .. B23K 9/0284; B23K 9/291; B23K 37/0276; B23K 2101/06; B23K 26/703;
 (Continued)

(56) References Cited

U.S. PATENT DOCUMENTS 5,310,982 A    5/1994  Jusionis
6,433,307 B1 *  8/2002  Larikka ................ B23K 9/0284
                                                   219/60 A

FOREIGN PATENT DOCUMENTS

CN          107466260 A    12/2017
DE            1440322 B1    8/1971
(Continued)

OTHER PUBLICATIONS

Counterpart Chinese Examination Report dated Jun. 30, 2021 (5 pages).

*Primary Examiner* — Phuong T Nguyen
(74) *Attorney, Agent, or Firm* — Renner, Kenner, Greive, Bobak, Taylor & Weber

(57) ABSTRACT

A device for welding pipe branches and extensions from inside the main pipe. The device includes a frame, a frame cylinder, an elongated electrode shaft having a longitudinal central axis, a rotator disc through which the electrode shaft is able to slide axially, an end of shaft electrode holder, an electrode fastened to the holder, a welding jig with: a fastening element; a rotating element, which combines the rotational axis of the welding jig with the central axis of the electrode shaft; a main pipe support bracket; and an adapter piece which guides the shielding gas channel, into the main pipe and into the pipe branch or extension to be welded. The rotator disc is equipped with a locking device to immovably lock the electrode shaft in relation to the rotator disc.

8 Claims, 5 Drawing Sheets

(51) Int. Cl.
*B23K 37/02* (2006.01)
*B23K 101/06* (2006.01)

(58) Field of Classification Search
CPC ...... B23K 26/082; B23K 26/32; B23K 26/24;
B23K 26/28; B23K 26/22; B23K
26/0622; B23K 2101/18; B23K 2101/006;
B23K 26/323; B23K 26/044; B23K
2203/04; B23K 26/26; B23K 26/244;
B23K 26/14; B23K 31/125; B23K 26/20;
B23K 26/0066
USPC .... 219/60, 121.63, 121.64, 119, 125.11, 136
See application file for complete search history.

(56) References Cited

FOREIGN PATENT DOCUMENTS

| | | | |
|---|---|---|---|
| EP | 1633520 | B1 | 9/2010 |
| JP | 56141987 | | 11/1981 |
| JP | 9271985 | A | 10/1997 |
| WO | 2004101207 | A1 | 11/2004 |

\* cited by examiner

DEVICE FOR WELDING PIPE BRANCHES AND EXTENSIONS

The invention relates to a device for welding pipe branches and extensions to a main pipe from inside the main pipe, the device including a frame and a frame cylinder, an elongated electrode shaft having a longitudinal central axis, around which the electrode shaft is rotatably arranged, a rotator disc of the electrode shaft, through which the electrode shaft is able to slide axially, an electrode holder in the end of the electrode shaft, an electrode fastened to the holder, a welding jig to support the main pipe in the welding station, a fastening element of the welding jig, a rotating element of the welding jig, to which the fastening element is fastened and which is rotatably bearing-mounted inside the frame cylinder such that the rotational axis of the welding jig combines with the central axis of the electrode shaft.

Such a device is known from U.S. Pat. No. 6,433,307 B1. Therein, the welding object is approached from the side of the pipe branch. The pipe parts to be welded are fastened to a cassette, which is slid inside a shielding gas chamber, parallel to the electrode shaft, to the desired welding site.

From EP 1633520 B1 is also known a device, with which pipe branches can be fastened on a main pipe by inside welding. The pipe walls for their part define the shielding gas chambers. In this also, the object to be welded is approached from the side of the pipe branch.

In practise, there are many welding requirements for cylindrical pieces, which cannot be implemented using the devices described above. Many of these requirements also cannot be implemented using conventional orbital welding devices.

In the following are some typical examples of these kinds of welding requirements:
- branch pipes to be welded on a main pipe, the inner diameters of which are so small that devices of the kind described will not fit into the branch pipe.
- pipe parts, which have an adequately large through hole opening, but the junction to the main pipe is so much larger than the through hole opening that the distance of the electrode from the welding surface becomes too great.
- there are so many branch pipes along the perimeter of the main pipe that building an adequately large closed shielding gas chamber is not practical, and welding with conventional orbital welding devices is also impossible.

The object of the invention is to further develop said type of device of the preamble such that welding requirements more diverse than in the past, including above said welding requirements, can be implemented using inside welding of the pipe parts.

This object is achieved by a device according to the invention, the characterizing features of which are set forth in the accompanying claim 1. The dependent claims present preferred embodiments of the invention.

Using a device according to the invention, the electrode is guided, in the longitudinal direction of the main pipe, inside the main pipe, to the welding object. The rotational axis of the electrode shaft combines with the central axis of the main pipe to be welded. The electrode shaft rotates and moves axially according to a set program and, simultaneously, the electrode follows the wall of the main pipe at a set distance. By programming the two servo motors moving the electrode shaft, it is possible to achieve onto the surface of the pipe any desired welding pattern. In other words, by programming the movements of the electrode shaft, it is possible to select a welding event, such as extending a pipe or welding a flange to the end of a pipe (requires perpendicular rotation of the electrode in relation to the central axis), or welding a branch pipe (requires a back-and-forth rotation with a simultaneous back-and-forth axial movement). Further, it is possible to implement a so-called weaving movement to widen the welding seam.

In the following, the invention is illustrated by means of embodiment examples with reference to the accompanying drawings, in which.

Figure 1:
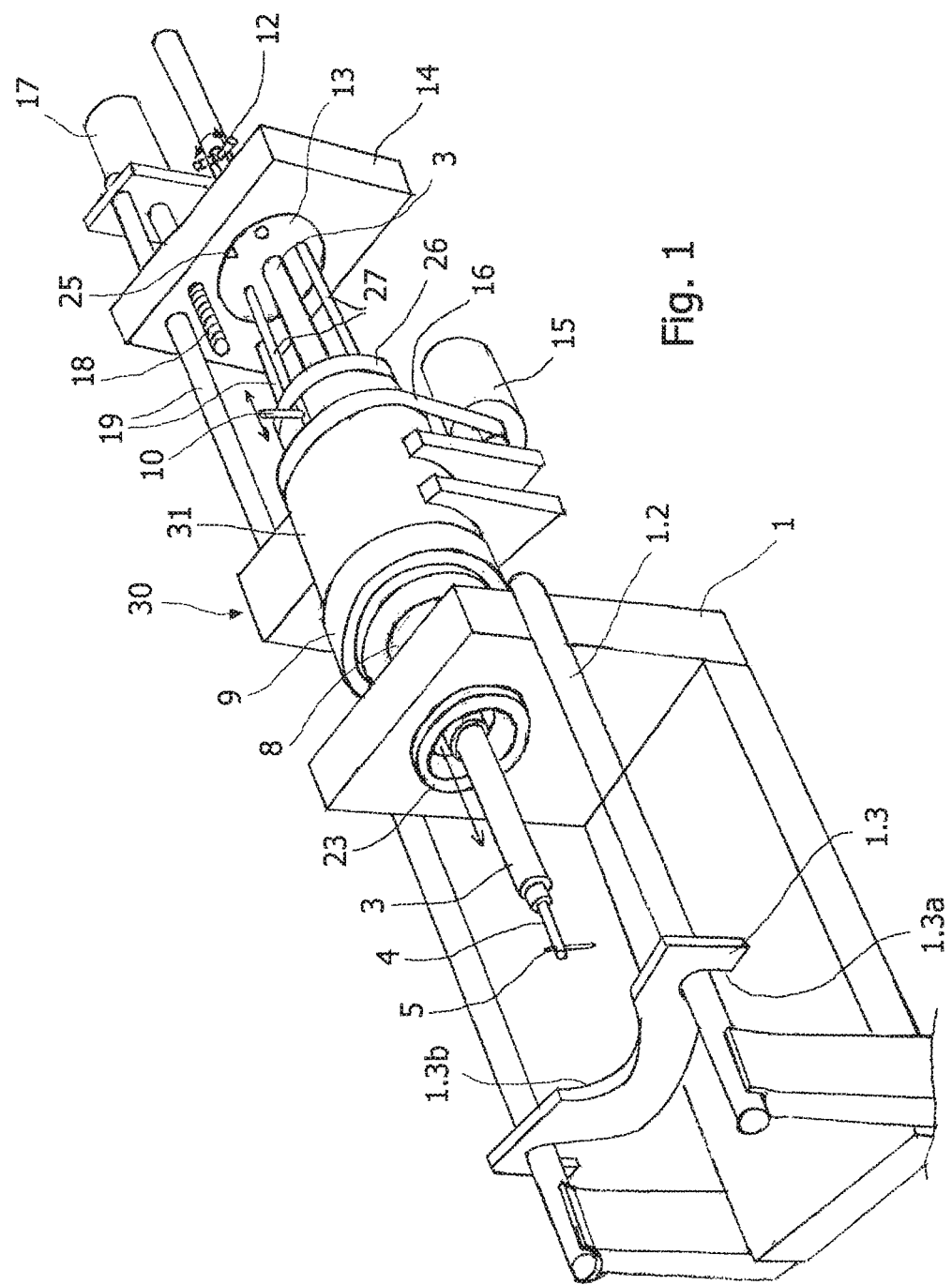
FIG. 1 shows a device according to the invention as a perspective view from the upper oblique, when the device has a welding jig according to the first embodiment of the invention.

The device of FIG. 1 includes a frame 30 and a frame cylinder 31, through which passes an elongated electrode shaft 3. In the end of the electrode shaft 3 is an electrode holder 4 and an electrode 5 fastened to the holder, the electric current discharging from the tip of which melts the materials of the parts to be welded together on both sides of the seam line. The electrode shaft is rotatably arranged around its longitudinal central axis. Rotation takes place by the rotator disc 13 of the electrode shaft 3, through which the electrode shaft is able to slide axially. The power transmission shafts 27 shift the rotational drive from the drive wheel 26 to the rotator disc 13. The motor 15 rotates the main drive wheel via the belt 16, the drive wheel 26 being switched with a switch 10 to rotate by the main drive wheel.

Figure 2:
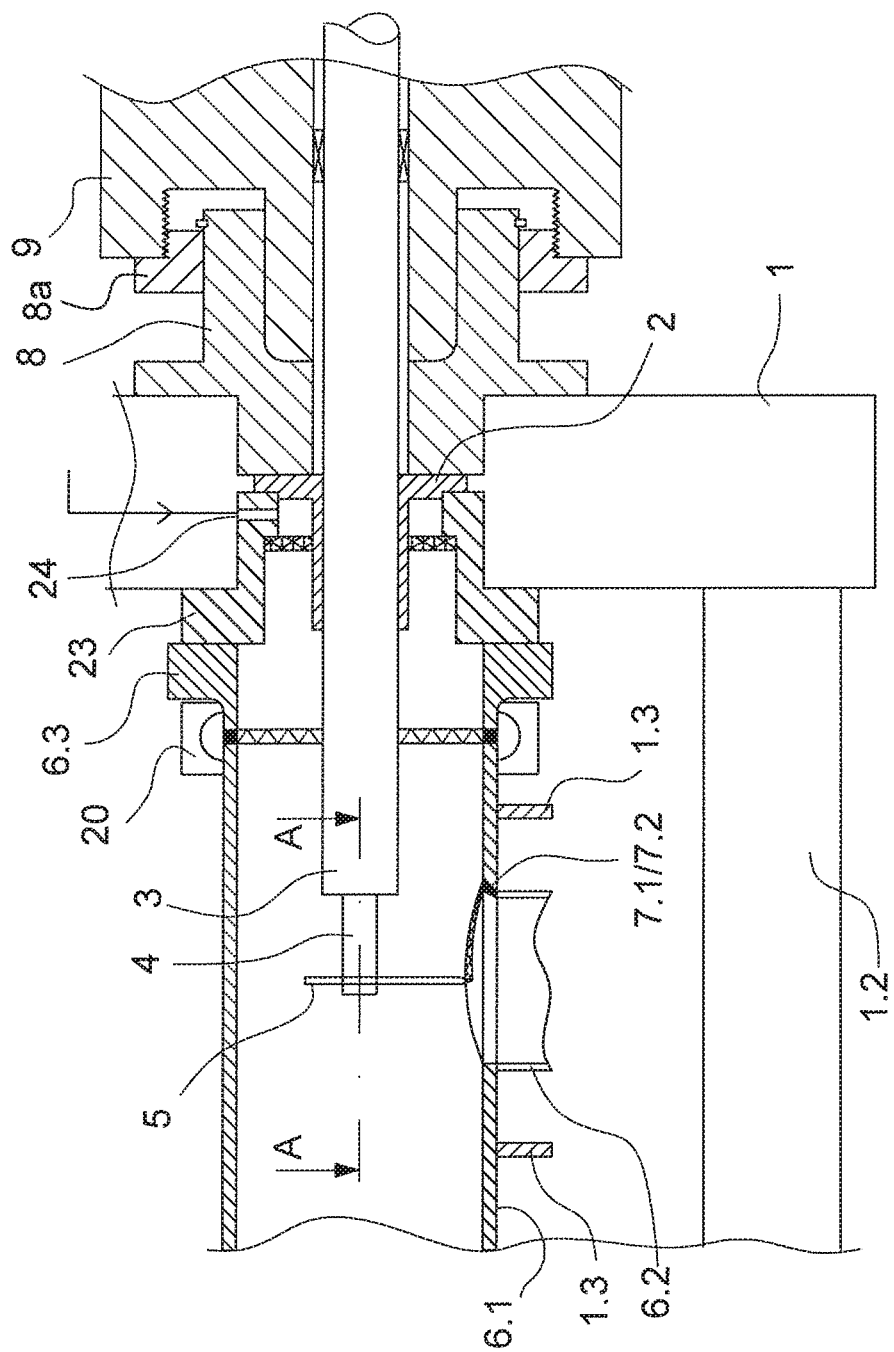
FIG. 2 shows a detail of a device according to FIG. 1 as a vertical section, illustrating the placement of the pipe parts in a welding situation.

As is seen from FIGS. 1 and 2, the welding jig 1, 1.2, 1.3 is arranged to support the main pipe 6.1 in the welding station. To the frame 1 of the welding jig is fastened the fastening element 8, 8a of the welding jig, which includes an insulator part 8 made from electrically insulating material and a fastening nut 8a, which is screwed to the rotating element 9 of the welding jig. The insulator part 8 is screwed to the vertical plate of the frame 1 of the welding jig, and it disconnects the conductive connection between the welding jig and the rotating element 9. The rotating element 9 is rotatably bearing-mounted inside the frame cylinder 31. The rotational axis of the welding jig combines with the central axis of the electrode shaft 3.

To the frame 1 of the welding jig is fastened a support 2 of the electrode shaft 3, which is made from a non-conductive substance and forms an insulation between the electrode shaft and the welding jig.

By the switch 10, the rotational drive elements 15, 16 are to be switched to rotate optionally either the rotating element 9 of the welding jig or the drive wheel 26 of the rotator disc 13 for rotating the welding jig and the electrode shaft optionally by the same rotational drive elements 15, 16. By the switch 10 can thus be selected an action, in which the electrode shaft does not rotate and the welding jig rotates, or vice versa, that the electrode shaft rotates and the welding jig remains stationary.

Between the rotator disc 13 and the movement shaft 14 is a locking mechanism 25, by which the rotator disc 13 is to be non-rotatably locked in relation to the movement shaft 14. This assures the non-rotatable station of the electrode shaft as the welding jig rotates.

The welding jig has support brackets 1.2, 1.3 for the main pipe 6.1, with which the main pipe 6.1 is to be supported in the station, in which the central axes of the main pipe 6.1 and the electrode shaft 3 are combined. The welding jig has, surrounding the electrode shaft 3, an adapter piece 23, to which is connected the shielding gas channel 24 and through which the shielding gas is adapted to be guided into the main pipe when the main pipe or the extension 6.3 to be welded to the main pipe rests against the adapter piece 23 or the frame 1 of the welding jig around the adapter piece 23. Thus, the inside shielding gas can be guided to the welding site without a shielding gas chamber. The outside of the welding site can be sealed into its own shielding gas space by means suited to this purpose, such as the annular space 20 seen in FIG. 2.

The rotator disc 13 of the electrode shaft is equipped with a locking device 12, by which the electrode shaft 3 is to be locked axially immobile in relation to the rotator disc 13. The rotator disc 13 of the electrode shaft is rotatably bearing-mounted to the movement shaft 14, which is arranged to be moved in the axial direction of the electrode shaft 3 according to a desired program, wherein the electrode shaft 3 moves in its axial direction in a corresponding manner when the electrode shaft 3 is locked by the locking device 12 to the movement shaft 14. In this case, the electrode shaft can be moved axially in the manner required by the welding program. The movement shaft 14 is supported by slide guides 19, which are parallel to the electrode shaft 3 and fastened to the frame 30. The movement shaft 14 is moved by the screw 18 driven by the motor 17.

Figure 2A:
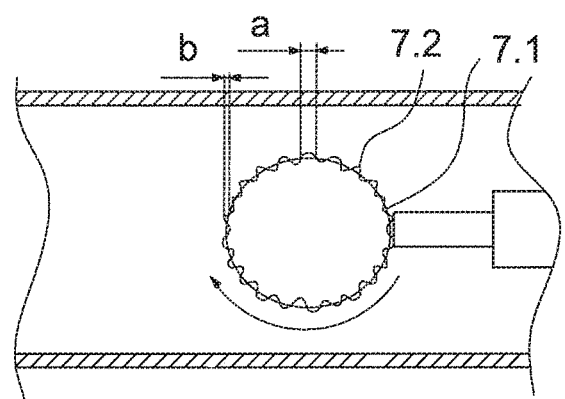
FIG. 2A shows a detail of FIG. 2 in a section A-A, illustrating the welding pattern made by weaving, which curves over both sides of the basic line to be welded. The basic line is in the pipes typically circular, but can be some other pattern.

The support brackets 1.2, 1.3 include support shafts 1.2 parallel to the electrode shaft 3 and support ribs 1.3 transverse in relation to the support shafts and having indentations (1.3*a*) adapted to the support shafts and a rib 1.3*b*, which positions the center line of the main pipe placed onto the support bracket 1.3 onto an extension of the center line of the electrode shaft 3. In the case presented, the electrode shaft 3 enters partially inside the main pipe 6.1, and the electrode 5 is in the welding station of the branch pipe 6.2. FIG. 2*a* shows the trajectory 7.1 of the electrode while welding a normal welding seam in the direction of the seam line. The trajectory 7.2 describes the movement of the electrode when there is a desire to widen the welding seam. Therein, the electrode advances a distance "a" while making a back-and-forth movement "b" +/− in relation to the trajectory 7.1 of the seam line.

Figure 3:
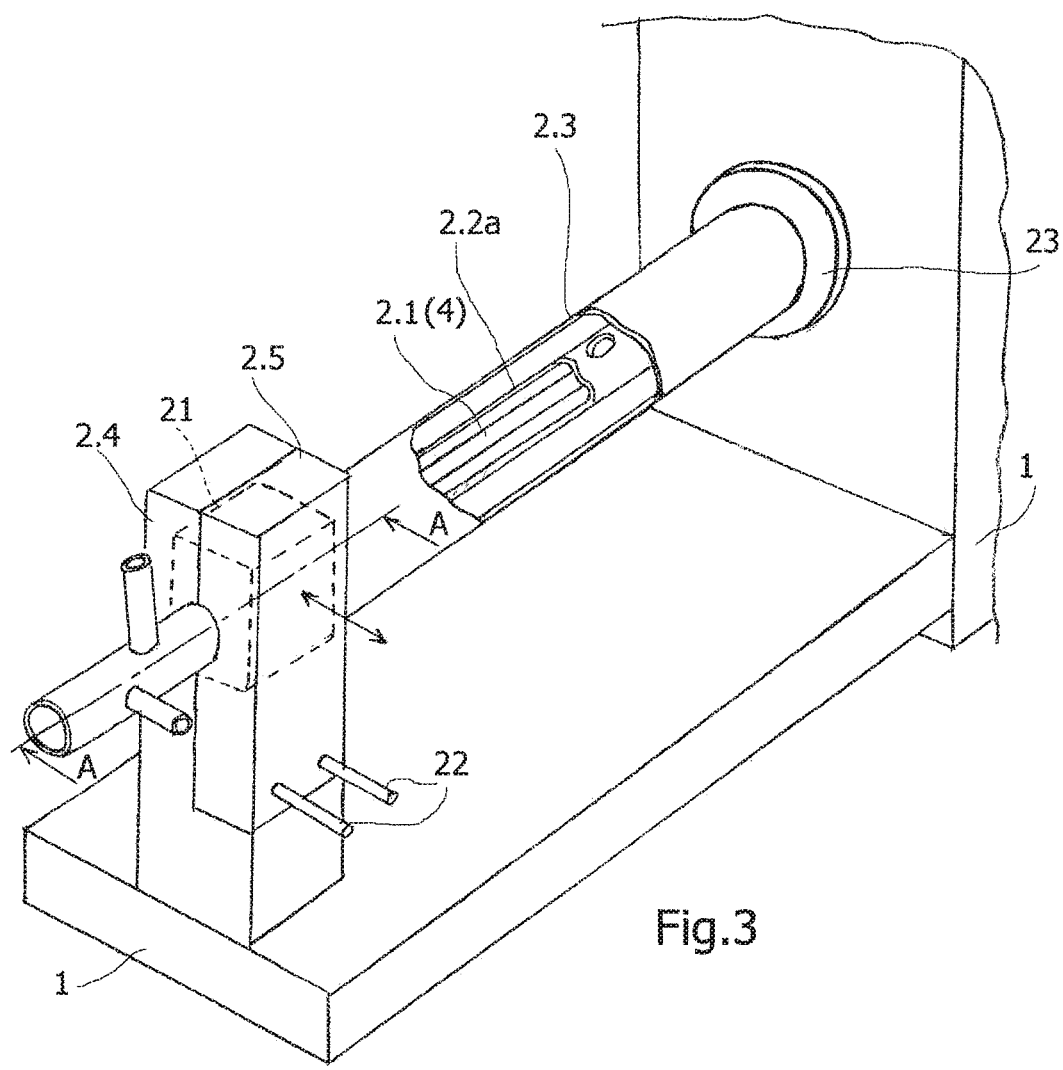
FIG. 3 shows a welding jig according to a second embodiment of the invention, which can be used in a device according to FIG. 1 instead of the welding jig seen in FIG. 1.
Figure 3A:
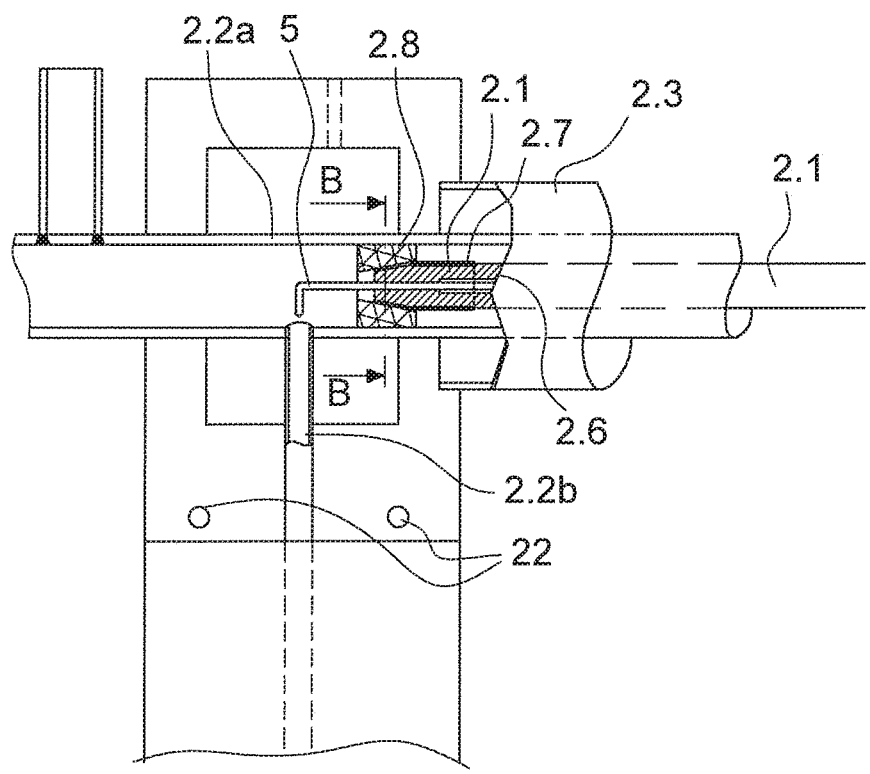
FIG. 3A shows a detail of the welding jig according to FIG. 2 in a section A-A.
Figure 3B:
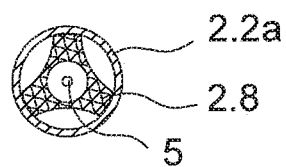
FIG. 3B shows FIG. 3A from a section taken along the line B-B.

FIGS. 3-3B show a welding jig 1, 2.4, 2.5 according to a second embodiment of the invention, which is adapted for welding to a main pipe 2.2*a* numerous branch pipes of small diameter. The jig frame 1 is formed from horizontal and vertical frame parts, which, in the present case, are in the shape of plates. The support bracket 2.4, 2.5 for the main pipe 2.2*a* is fastened to the outer end of the horizontal frame part of the jig frame 1, at a distance from the vertical frame part, which has the adapter piece 23 for guiding shielding gas into the main pipe 2.2*a*. The support bracket 2.4, 2.5 has a shielding gas chamber 21 for the outside shielding gas of the welding site, the opposite walls of the chamber having holes corresponding to the outer diameter of the main pipe, the central axes of which are on an extension of the central axis of the electrode shaft 3. The support bracket 2.4, 2.5 is split in the middle of the hole and the splitting site, i.e. the division plane, has another hole for the branch pipe 2.2*b*. The mobile part 2.5 of the support bracket 2.4, 2.5 is to be moved along the slide guides 22 in relation to the fixed part 2.4.

Between the support bracket 2.4, 2.5 and the adapter piece 23 is a shielding gas pipe 2.3 for the inside shielding gas of the welding site. The shielding gas is able to pass from the shielding gas pipe 2.3 into the main pipe 2.2*a* from the holes for the branch pipe 2.2*b* and from the end of the main pipe. If necessary, the outer end of the main pipe may be closed at least partially in order to reduce the flow rate of the shielding gas.

The electrode holder 2.1 is extended adequately long in order that the electrode extends into the main pipe, up to the branch pipe closest to the outer end of pipe main. This requires of the electrode holder a special arrangement. The outer surface 2.6 of the conductive part 2.6 of the electrode holder 2.1 has an electrically insulating layer 2.7, at least in the vicinity of the outer end of electrode holder. Around the outer end of the electrode holder 2.1 are one or more supports 2.8, which are adapted to correspond to the inner diameter of the main pipe 2.2*a*. The support 2.8 is made from electrically insulating material, for example, from ceramics. The outer surface of the support 2.8 has grooves, through which the shielding gas is able to flow over the support to the welding site. The support 2.8 extends a short distance on top of the insulating layer 2.7, wherein the breakthrough of an electric spark from the electrode holder 2.1 into the main pipe 2.2*a* is prevented. This is necessary in case of small pipe diameters, when the distance from the electrode holder to the main pipe becomes adequately short.

The outer end of the electrode holder 2.1 is preferably conical, and the inner hole of the support 2.8 adapted to the outer end is correspondingly conical. In this case, the support 2.8 functions also as a tensioner, which compresses the electrode holder 2.1 tightly against the electrode 5.

The main pipe 2.2*a* is perforated at the desired branching sites. The main pipe 2.2*a* is inserted through the hole of the support bracket part 2.4 on top of the electrode holder 2.1 such that the first hole to be welded (closest to the outer end of the main pipe) gets to the site of the branch pipe 2.2*b*. The branch pipe 2.2*b* is fitted into the hole of the main pipe and the mobile part 2.5 of the support bracket is sealed against the fixed part 2.4. The welding station is ready. After welding, the mobile part 2.5 is opened and the next hole in the welded main pipe 2.2*a* is moved to the site of the branch pipe. The main pipe moves axially and rotates around its axis, which allows the welding of consecutive branches in different directions.

The invention claimed is:

1. A device for welding pipe branches and extensions to a main pipe from inside the main pipe, the device including a frame and a frame cylinder, an elongated electrode shaft having a longitudinal central axis, around which the electrode shaft is rotatably arranged, a rotator disc of the electrode shaft, through which the electrode shaft is able to slide axially, an electrode holder in the end of the electrode shaft, an electrode fastened to the holder, a welding jig for supporting the main pipe in the welding station, a fastening element of the welding jig, a rotating element of the welding jig, to which the fastening element is fastened and which is rotatably bearing-mounted inside the frame cylinder such that the rotational axis of the welding jig combines with the central axis of the electrode shaft, characterized in that the welding jig has a support bracket for the main pipe, by which the main pipe is to be supported in the station, in which the central axes of the main pipe and the electrode shaft are combined, that the welding jig has, surrounding the electrode shaft, an adapter piece, to which is connected a shielding gas channel, the shielding gas being adapted to be guided through the adapter piece into the main pipe, and through it, also into the pipe branch or extension to be welded, when the main pipe, or the pipe extension to be welded to the main pipe, or a shielding gas pipe surrounding the main pipe rests against the adapter piece, and that the rotator disc of the electrode shaft is equipped with a locking device, with which the electrode shaft is to be locked axially immobile in relation to the rotator disc.

2. The device according to claim 1, characterized in that the rotator disc of the electrode shaft is rotatably bearing-mounted to the movement shaft, which is arranged to be moved in the axial direction of the electrode shaft according to a desired program, wherein the electrode shaft moves in its axial direction in a corresponding manner.

3. The device according to claim 1 or 2, characterized in that the device includes rotational drive elements and a switch, by which the rotational drive elements are to be switched to rotate either the rotating element of the welding jig or a drive wheel of the rotator disc for rotating the welding jig and the electrode shaft by the same rotational drive elements.

4. The device according to claim 2, characterized in that between the rotator disc and the movement shaft is a locking mechanism, by which the rotator disc is to be non-rotatably locked in relation to the movement shaft.

5. The device according to claim 1, characterized in that the support bracket includes support shafts parallel to the electrode shaft and support ribs transverse in relation to the support shaft, the support ribs having indentations adapted to the support shafts and a rib, which positions the center line of the main pipe placed onto the support bracket onto an extension of the center line of the electrode shaft.

6. The device according to claim 1, characterized in that the support bracket has a shielding gas chamber for the shielding gas outside the welding site, the opposite walls of the chamber having holes corresponding to the outer diameter of the main pipe, the central axis of which is on an extension of the central axis of the electrode shaft, that between the support bracket and the adapter piece is the shielding gas pipe for the shielding gas inside the welding site, that the support bracket is split in the middle of the hole and that the splitting site has another hole for the branch pipe.

7. The device according to claim 1 or 6, characterized in that the outer surface of the conductive electrode holder has an electrically insulating layer, at least in the vicinity of the outer end of the electrode holder, that the outer surface of the electrode holder has one or more supports, which are adapted to correspond to the inner diameter of the main pipe, and that the outer surface of the support has grooves, through which the shielding gas is able to flow over the support.

8. The device according to claim 7, characterized in that the outer end of the electrode holder is conical and the inner hole of the support adapted to the outer end is correspondingly conical, and that the support adapted to the outer end extends partially on top of the insulating layer.

* * * * *